United States Patent
Kiyose

(10) Patent No.: US 8,456,648 B2
(45) Date of Patent: Jun. 4, 2013

(54) OPTICAL DETECTION DEVICE, ELECTRONIC APPARATUS, AND OPTICAL DETECTION METHOD

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/246,072

(22) Filed: Sep. 27, 2011

(65) Prior Publication Data

US 2012/0113436 A1    May 10, 2012

(30) Foreign Application Priority Data

Nov. 5, 2010   (JP) .................. 2010-248172

(51) Int. Cl.
*G01B 11/00* (2006.01)

(52) U.S. Cl.
USPC .......................................... 356/615; 356/614

(58) Field of Classification Search
USPC ........ 356/614–624; 250/221, 222.1; 345/173, 345/175, 156–158, 7–9
See application file for complete search history.

(56) References Cited

U.S. PATENT DOCUMENTS

| | | | |
|---|---|---|---|
| 6,512,507 | B1 | 1/2003 | Furihata et al. |
| 6,953,926 | B2 | 10/2005 | Reime |
| 2002/0015159 | A1 * | 2/2002 | Hashimoto ............ 356/620 |
| 2012/0062905 | A1 | 3/2012 | Kiyose |
| 2012/0065914 | A1 | 3/2012 | Kiyose |

FOREIGN PATENT DOCUMENTS

| | | |
|---|---|---|
| JP | 11-345085 | 12/1999 |
| JP | 2003-534554 | 11/2003 |
| JP | 2009-008537 | 1/2009 |

* cited by examiner

*Primary Examiner* — Tri T Ton
(74) *Attorney, Agent, or Firm* — Harness, Dickey & Pierce, P.L.C.

(57) ABSTRACT

An optical detection device includes: an irradiation unit that emits irradiation light onto an area formed along a planar area; first and second light receiving units that receive reflection light of the irradiation light reflected by a target object; and a calculation unit that calculates positional information of the target object based on a light reception result of at least one of the first and second light receiving units. A distance between the second light receiving unit and the planar area is shorter than a distance between the first light receiving unit and the planar area, and the first and second light receiving units receive the reflection light that is incident in a direction along the planar area.

9 Claims, 12 Drawing Sheets

OPTICAL DETECTION DEVICE, ELECTRONIC APPARATUS, AND OPTICAL DETECTION METHOD

BACKGROUND

1. Technical Field

The present invention relates to an optical detection device, an electronic apparatus, and an optical detection method.

2. Related Art

In electronic apparatuses such as a cellular phone, a personal computer, a car navigation device, a ticket-vending machine, and a banking terminal, recently, display devices provided with a position detecting function in which a touch panel is arranged on the front face of a display unit are used. According to such display devices, a user can input information by pointing an icon or the like on a display image while referring to the image displayed on the display unit. As position detecting types using such a touch panel, for example, a resistive type, an electrostatic capacitive type, and the like are known.

Meanwhile the display area of a projection-type display device (projector) or a display device used for digital signage is larger than that of the display device of a cellular phone or a personal computer. Accordingly, in such a display device, it is difficult to implement position detection using a touch panel of the resistive type or the electrostatic capacitive type.

As a general technique relating to a position detecting device for a projection-type display device, for example, a technique disclosed in JP-A-11-345085 is known.

However, in the above-described general technique, although a hovering process in which a pointer (cursor) is moved in accordance with the position of an object (target object) can be easily performed, it is difficult to switch between the hovering process and a command process (determination operation) in which a point is determined or the like.

In a character-input application, the command process corresponds to a process (drawing command) in which a character is drawn at a position on a screen that corresponds to a position traced by an object (target object), and the hovering process corresponds to a process in which only a cursor is moved to a position on the screen that corresponds to a drawing target position without drawing a character.

In a case where switching between the two processes cannot be appropriately performed, for example, the drawing command is constantly executed, and accordingly, characters are continuously written as one-stroke writing, whereby a space between characters, an inter-character gap, or the like cannot be represented. On the other hand, in a case where only the hovering process (a cursor moving process) is constantly performed, drawing of a character cannot be performed at all although a drawing target position can be perceived.

In addition, a method may be considered in which a space between characters is represented by using a state (no-input state) in which neither the command process nor the hovering process is performed, in other words, switching between the command process and the no-input state is performed. However, in such a case, the hovering process is not performed, and there is a problem in that any drawing target position cannot be recognized.

Furthermore, in an application (for example, a file manager or the like) in which an icon on the screen is selected and executed, the command process corresponds to an icon executing command, and the hovering process corresponds to an icon selecting process. In such a case, when switching between the hovering process and the command process cannot be appropriately performed, there is a problem in that an icon intended by a user cannot be appropriately selected or executed.

SUMMARY

An advantage of some aspects of the invention is that it provides an optical detection device, an electronic apparatus, and an optical detection method capable of switching between a hovering process and a command process in accordance with a distance between a planar area such as an image display surface and a target object by detecting positional information of the target object.

Application Example 1

This application example is directed to an optical detection device including: an irradiation unit that emits irradiation light; first and second light receiving units that receive reflection light of the irradiation light reflected by a target object; and a calculation unit that calculates positional information of the target object based on a light reception result of at least one of the first and second light receiving units. The first and second light receiving units receive the reflection light that is incident in a direction along a planar area, and a distance between the second light receiving unit and the planar area is shorter than a distance between the first light receiving unit and the planar area.

According to the above-described application example, the second light receiving unit receives the reflection light when a distance between the target object and the planar area is short. In addition, the first light receiving unit receives the refection light when a distance between the target object and the planar area is long. Accordingly, the distance between the target object and the planar area can be determined based on the results of light reception of the first and second light receiving units.

Application Example 2

This application example is directed to the above-described application example, wherein the irradiation unit is arranged between the first light receiving unit and the second light receiving unit in an intersection direction intersecting the planar area.

According to this application example, the irradiation light can be uniformly emitted onto the area in which a target object can be detected by the first and second light receiving units by using one irradiation unit.

Application Example 3

This application example is directed to the above-described application example, wherein the first and second light receiving units respectively include a light receiving device that receives the reflection light and an incidence light regulating unit that regulates an incidence direction of the reflection light in which the reflection light is incident to the light receiving device.

According to this application example, it is prevented that the reflection light from a target object in an area located close to the planar area is received by the second light receiving unit, or the reflection light from a target object in an area located far from the planar area is received by the first light receiving unit, whereby the detection accuracy of the target object can be improved.

Application Example 4

This application example is directed to the above-described application example, wherein the irradiation unit emits the irradiation light radially, of which an intensity differs in accordance with an irradiation direction in a plan view toward the planar area, and the calculation unit calculates a direction in which the target object is positioned with respect to the irradiation unit based on the light reception result of at least one of the first and second light receiving units.

According to this application example, since the intensity of the irradiation light differs in accordance with the irradiation direction, the intensity of light reception of the reflection light differs in accordance with a direction in which a target object is positioned with respect to the irradiation unit. Accordingly, the direction in which a target object is positioned can be detected based on the intensity of light reception of the reflection light.

Application Example 5

This application example is directed to the above-described application example, wherein the irradiation unit includes a first light source section that forms a first irradiation light intensity distribution in a light intensity distribution forming area and a second light source section that forms a second irradiation light intensity distribution, of which an intensity distribution is different from that of the first irradiation light intensity distribution, in the light intensity distribution forming area, and the first irradiation light intensity distribution is an intensity distribution in which an intensity of the irradiation light decreases from one end side of the light intensity distribution forming area toward the other end side, and the second irradiation light intensity distribution is an intensity distribution in which an intensity of the irradiation light decreases from the other side of the light intensity distribution forming area toward the one end side.

According to this application example, two detection results including a detection result of a target object according to the first irradiation light intensity distribution and a detection result of the target object according to the second irradiation light intensity distribution can be acquired. By comparing the two detection results with each other, the influence of disturbance light such as ambient light included in the detection results can be reduced, whereby the detection accuracy can be improved.

Application Example 6

This application example is directed to an electronic apparatus that includes the optical detection device according to any one of the above-described application examples.

According to this application example, in a case where the target object is used as an input device, switching between the hovering process and the command process can be performed in accordance with a distance between the planar area such as an image display surface and the target object. Accordingly, an electronic apparatus having an interface that can be easily used by a user can be realized.

Application Example 7

This application example is directed to an optical detection method for detecting positional information of a target object. The optical detection method includes: emitting irradiation light onto a first area that is formed along a planar area and is interposed between first and second faces facing each other; emitting irradiation light onto a second area that is located between the first area and the planar area, is formed along the planar area, and is interposed between third and fourth faces facing each other; receiving reflection light of the irradiation light that is reflected by the target object in at least one of the first and second areas; and calculating the positional information of the target object based on a light reception result of the reflection light.

According to this application example, the reflection light reflected from a target object in the second area is received when a distance between the target object and the planar area is short. On the other hand, the reflection light reflected from the target object in the first area is received when the distance between the target object and the planar area is long. Accordingly, the distance between the target object and the planar area can be determined based on the results of light reception of the first and second light receiving units.

BRIEF DESCRIPTION OF THE DRAWINGS

The invention will be described with reference to the accompanying drawings, wherein like numbers reference like elements.

Hereinafter, an embodiment of the invention will be described with reference to the accompanying drawings.

DESCRIPTION OF EXEMPLARY EMBODIMENTS

Configuration Example of Optical Detection Device

Figure 1:
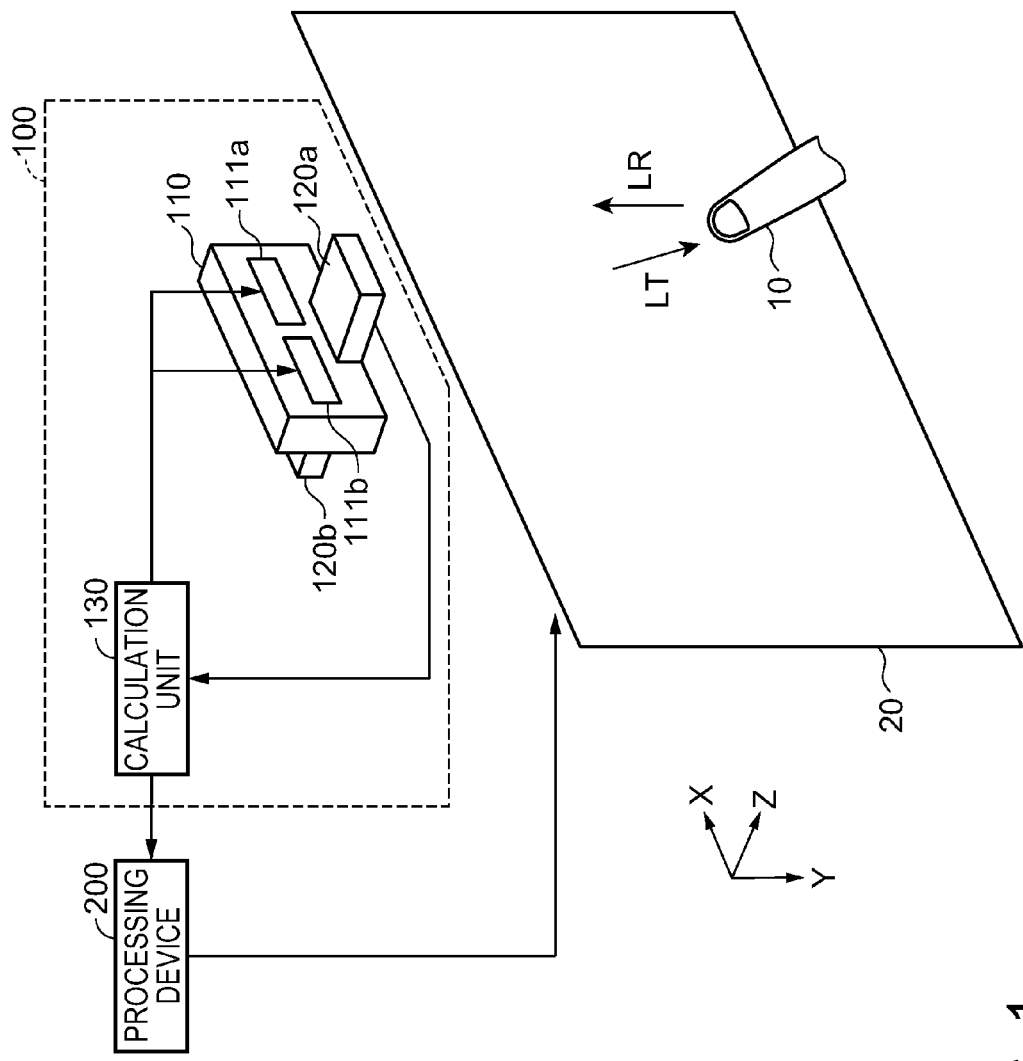
FIG. 1 is a configuration example of an optical detection device according to an embodiment of the invention.

FIG. 1 is a basic configuration example of an optical detection device 100. The optical detection device 100 shown in FIG. 1 includes an irradiation unit 110, a first light receiving unit 120a, a second light receiving unit 120b, and a calculation unit 130. A processing device 200 that performs a predetermined process based on position information of a target object 10 that is detected by the optical detection device 100 is connected to the optical detection device 100. In addition, the optical detection device 100 may be configured so as to include the processing device 200. Furthermore, it may be configured such that the functions of the calculation unit 130 and the processing device 200 are realized by an information processing device (for example, a PC or the like), and the optical detection device 100 is realized by operating the irradiation unit 110 and the light receiving units 120a and 120b in a cooperative manner.

The irradiation unit 110 includes a first light source section 111a and a second light source section 111b that respectively include a light emitting device such as an LED (light emitting diode) and emits irradiation light LT by allowing the light emitting devices to emit light.

The first light receiving unit 120a and the second light receiving unit 120b receive reflection light LR acquired by allowing the irradiation light LT to be reflected by the target object 10 such as a finger or a pen.

The second light receiving unit 120b is positioned on one side of the irradiation unit 110 that is a planar area 20 side thereof in the Z direction (a direction intersecting the planar area 20), and the first light receiving unit 120*a* is arranged on the other side of the irradiation unit 110.

Here, the planar area 20, for example, is a display surface of an information processing device, a projection plane of a projection-type display device, a display surface of a digital signage device, or the like. In addition, the planar area 20 may be a virtual display surface on which a stereoscopic image is displayed in a stereoscopic vision using a 3-dimensional display, holography, or the like. In the example shown in FIG. 1, the planar area 20 is a surface along the X-Y plane.

The target object 10 is an object that is detected by the optical detection device 100 and is an object that has a feature of reflecting at least the irradiation light LT.

The calculation unit 130 calculates Z position information that is position information of the target object 10 in the Z direction based on at least one of light receiving results of the first light receiving unit 120*a* and the second light receiving unit 120*b*. In addition, the calculation unit 130 may further calculate the X coordinate information and the Y coordinate information of the target object 10 by controlling the light emission amounts of the first light source section 111*a* and the second light source section 111*b*. The technique for calculating the Z position information, the X coordinate information, and the Y coordinate information by using the calculation unit 130 will be described later.

The processing device 200 performs a process of switching between a command process (determination function) and a hovering process (floating function) based on the Z position information of the target object 10 that is calculated by the calculation unit 130.

Figure 2A:
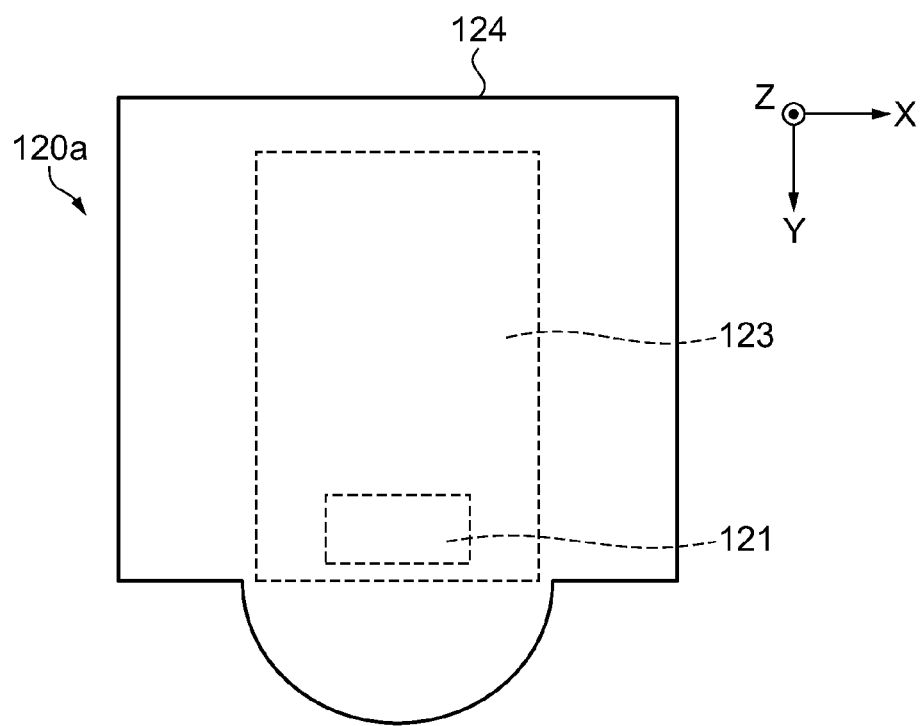
FIGS. 2A and 2B are a configuration example of a light receiving unit.
Figure 2B:
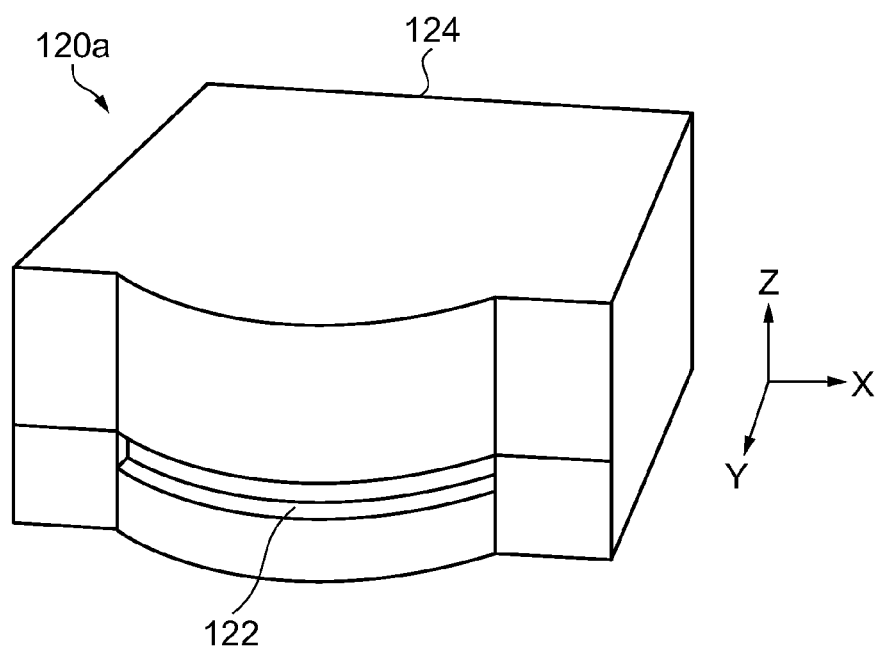

FIGS. 2A and 2B are a configuration example of the light receiving units 120*a* and 120*b*. Since the configurations of the light receiving units 120*a* and 120*b* are the same, the first light receiving unit 120*a* will be described as an example.

FIG. 2A is a plan view of the first light receiving unit 120*a*. The first light receiving unit 120*a* includes a light receiving device 121 such as a photodiode or a photo transistor. The light receiving device 121 is mounted on a wiring substrate 123 and is disposed inside a casing 124 formed from aluminum or the like.

As shown in FIG. 2B, in the first light receiving unit 120*a*, an incidence light regulating unit 122 is disposed which is used for allowing the light receiving device 121 to receive light incident at a predetermined angle. The incidence light regulating unit 122 is a member that selectively transmits light such as a slit or a louver. In this embodiment, a slit is disposed in the casing 124 as the incidence light regulating unit 122.

Figure 3:
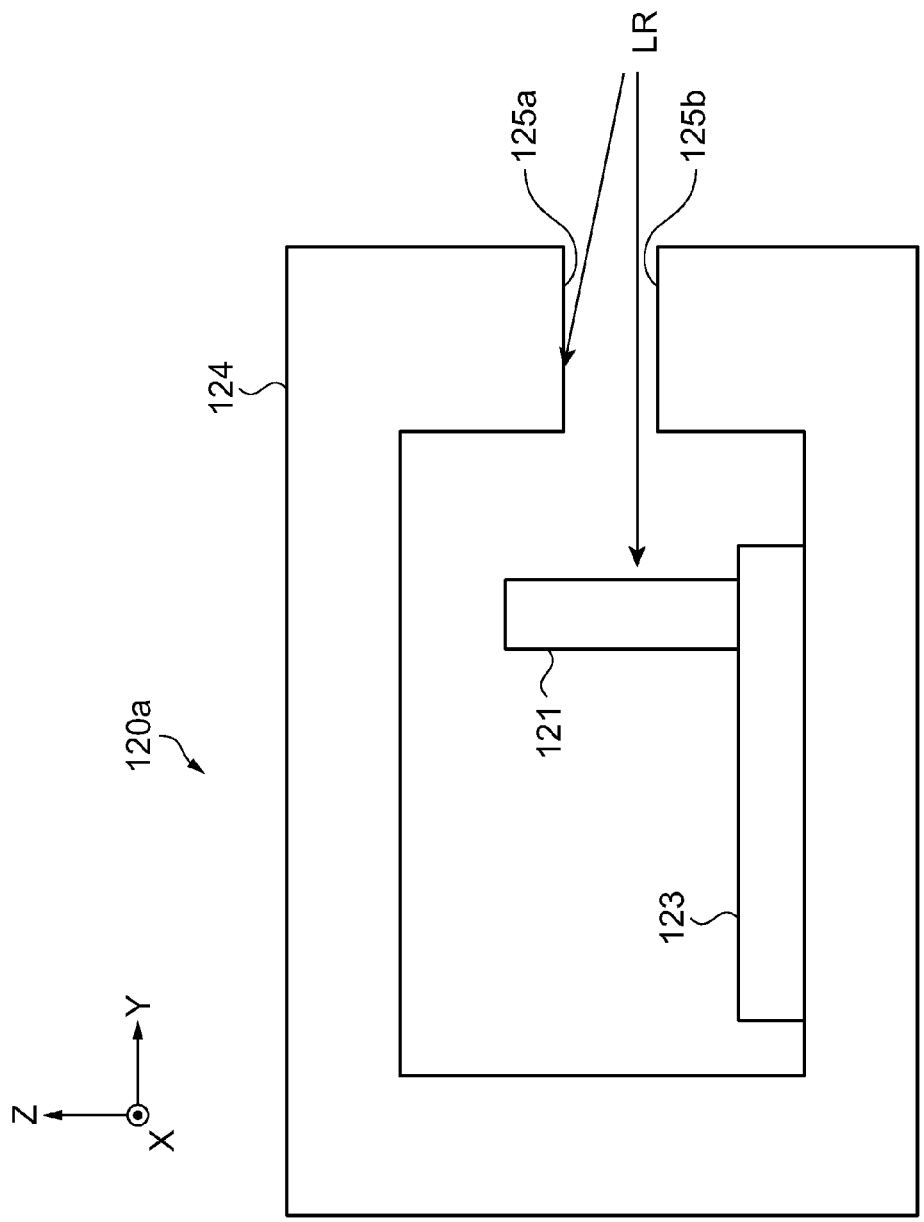
FIG. 3 is a cross-sectional view of the light receiving unit.

FIG. 3 is a cross-sectional view of the first light receiving unit 120*a*. As shown in FIG. 3, the slit according to this embodiment is disposed on the front side of the light receiving device 121. The slit includes slit faces 125*a* and 125*b* that face each other. Accordingly, light passing through the slit is regulated to be light incident at angles in an angle range that is regulated by the slit faces 125*a* and 125*b*. Then, the light receiving device 121 receives reflection light LR that has passed through the slit.

In this embodiment, the slit faces 125*a* and 125*b* are set as faces formed along the X-Y plane. Accordingly, an angle formed by the incidence direction in which the reflection light LR is incident to the light receiving device 121 and the X-Y plane can be limited. In other words, the light receiving device 121 receives incidence light of which the incidence angle on the Y-Z plane is within a predetermined range.

Next, the area in which the first light receiving unit 120*a* and the second light receiving unit 120*b* receive light will be described with reference to FIG. 4.

As an area in which the first light receiving unit 120*a* detects the target object 10 by receiving the reflection light LR of the target object 10, a first detection area 30*a* is set. Similarly, as an area in which the second light receiving unit 120*b* detects the target object 10 by receiving the reflection light LR of the target object 10, a second detection area 30*b* is set.

Here, the detection areas 30*a* and 30*b* are areas in which the light receiving units 120*a* and 120*b* can detect the target object 10 by receiving the reflection light LR and in which the accuracy that is in an allowable range can be acquired as the detection accuracy.

The first light receiving unit 120*a* and the second light receiving unit 120*b* receive reflection light LR incident in a direction extending along the planar area 20 but do not receive reflection light LR incident in a direction intersecting the direction extending along the planar area 20 by using the incidence light regulating unit 122.

Figure 4:
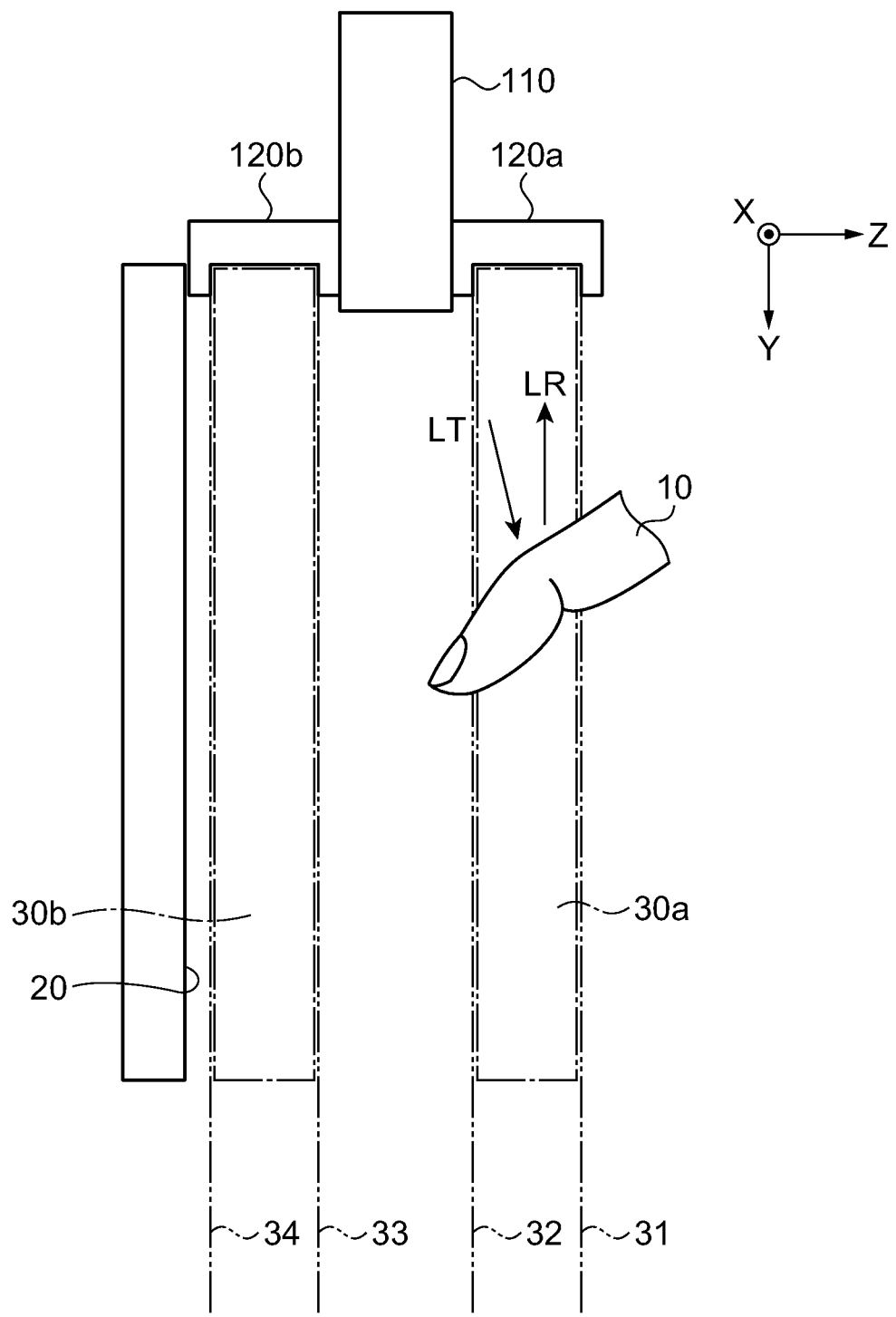
FIG. 4 is an example of the arrangement of the light receiving unit.

Accordingly, as shown in FIG. 4, the first detection area 30*a* is formed as an area along the planar area 20. Similarly, the second detection area 30*b* is formed as an area along the planar area 20. The second detection area 30*b* is set between the first detection area 30*a* and the planar area 20. In addition, the first detection area 30*a* and the second detection area 30*b* respectively have a width in the Z direction. The width of the first detection area 30*a* in the Z direction is regulated by the slit width of the first light receiving unit 120*a*, and the width of the second detection area 30*b* in the Z direction is regulated by the slit width of the second light receiving unit 120*b*. For example, as the slit width of the first light receiving unit 120*a* increases, the width of the first detection area 30*a* in the Z direction increases.

The first detection area 30*a* is regulated by a first area plane 31 and a second area plane 32 that are parallel to each other with a predetermined gap interposed therebetween. In addition, the first area plane 31 and the second area plane 32 are planes, which correspond to boundaries between an area in which light can be received by the first light receiving unit 120*a* and an area in which light cannot be received, extending along the planar area 20.

In addition, the second detection area 30*b* is regulated by a third area plane 33 and a fourth area plane 34 that are parallel to each other with a predetermined gap interposed therebetween. The third area plane 33 and the fourth area plane 34 are planes, which correspond to boundaries between an area in which light can be received by the second light receiving unit 120*b* and an area in which light cannot be received, extending along the planar area 20.

From the irradiation unit 110, irradiation light LT is emitted to at least the first detection area 30*a* and the second detection area 30*b*.

As shown in FIG. 4, the irradiation unit 110 is located between the first light receiving unit 120*a* and the second light receiving unit 120*b* in the Z direction. In other words, the first light receiving unit 120*a* and the second light receiving unit 120*b* are arranged so as to have the irradiation unit 110 interposed therebetween in the plan view in the X direction. Accordingly, a distance between the second light receiving unit 120*b* and the planar area 20 is shorter than a distance between the first light receiving unit 120*a* and the planar area 20. By arranging as such, the first detection area 30*a* and the second detection area 30*b* can be uniformly emitted with the irradiation light LT by using one irradiation unit 110.

In addition, it is preferable that the first light receiving unit 120*a* and the second light receiving unit 120*b* are arranged so as to have plane symmetry with respect to a plane that passes through the irradiation unit 110 and extends along the planar area 20. By arranging as such, the first light receiving unit 120a and the second light receiving unit 120b overlap each other in the plan view toward the planar area 20. Accordingly, the positional relationship of the first light receiving unit 120a with respect to the target object 10 and the irradiation unit 110 and the positional relationship of the second light receiving unit 120b with respect to the target object 10 and the irradiation unit 110 can be matched. Therefore, when a transformation of a light reception intensity into a direction is performed in the calculation of the X coordinate and the Y coordinate to be described later, a common transformation function and a common transformation table can be used for the first light receiving unit 120a and the second light receiving unit 120b. As a result, the transformation conversion can be performed without arranging a plurality of transformation functions and a plurality of transformation tables.

Figure 5:
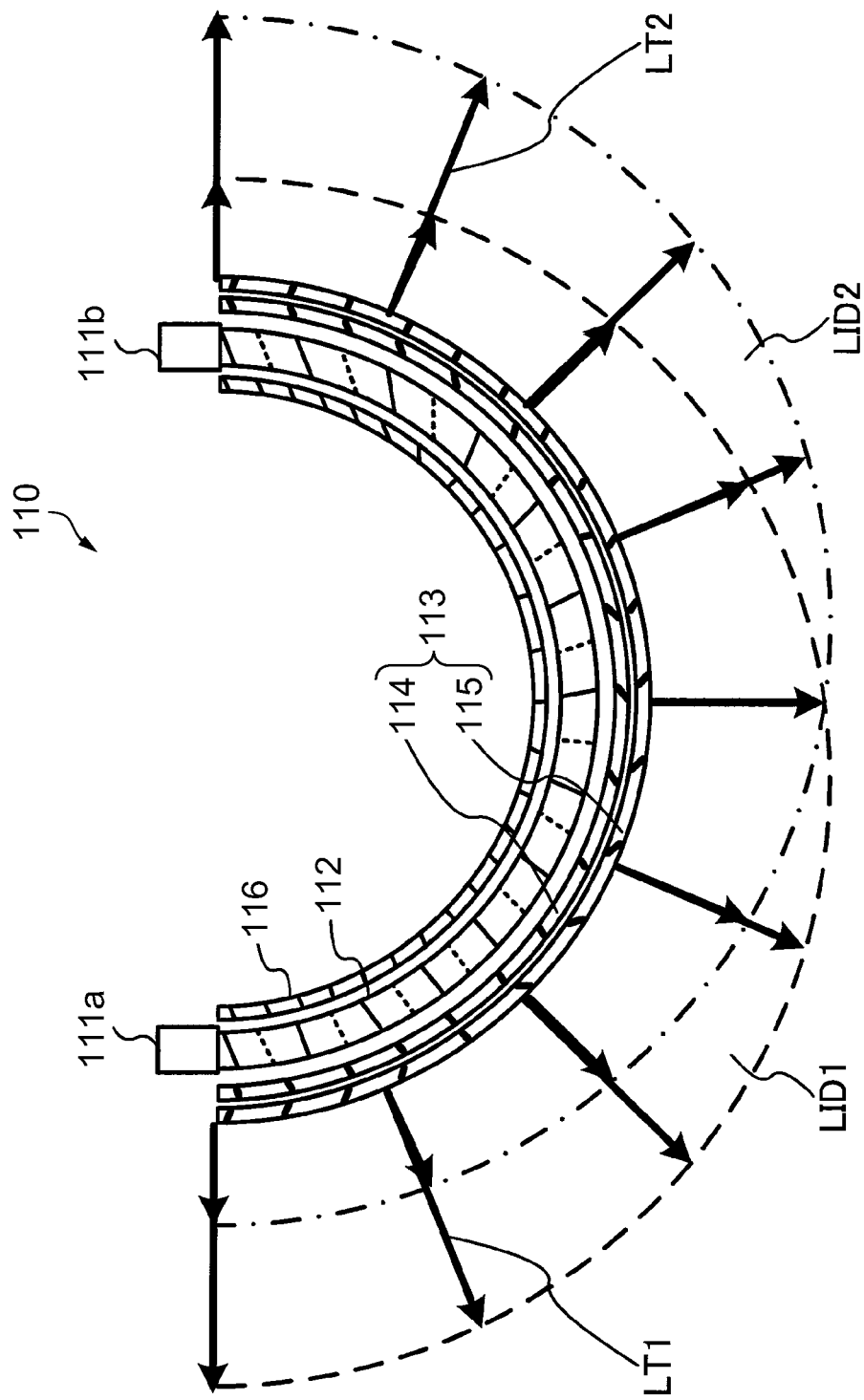
FIG. 5 is a configuration example of an irradiation unit.

FIG. 5 shows a configuration example of the irradiation unit 110 according to this embodiment. The irradiation unit 110 of the configuration example shown in FIG. 5 includes a first light source section 111a, a second light source section 111b, a light guide 112, and an irradiation direction setting section 113. In addition, the irradiation unit 110 includes a reflective sheet 116. The irradiation direction setting section 113 includes a prism sheet 114 and a louver film 115.

It is preferable that the light emitted by the first light source section 111a and the second light source section 111b is light of a wavelength band that is efficiently reflected by a target object 10 such as a user's finger or a touch pen or light of a wavelength band that is not included much in the ambient light that becomes disturbance light. More specifically, infrared light of a wavelength of about 850 nm that has high reflectivity for the surface of a human body or infrared light of a wavelength band of about 950 nm that is light of a wavelength band not included much in the ambient light, or the like.

As shown in FIG. 5, the first light source section 111a is disposed at one end side of the light guide 112. In addition, the second light source section 111b is disposed on the other end side of the light guide 112. The light guide 112 is a light guiding member that guides source light emitted by the first light source section 111a and the second light source section 111b. The light guide 112 is formed in a curved shape and guides the source light emitted from the first light source section 111a and the second light source section 111b along a light guiding path having the curved shape. Although the light guide 112 according to this embodiment is formed in an arc shape of which the central angle is 180 degrees, the light guide 112 may be formed in an arc shape of which the central angle is less than 180 degrees. The light guide 112, for example, is formed from a transparent resin member such as an acrylic resin or polycarbonate.

On the inner circumferential side of the light guide 112, the reflective sheet 116 is disposed. Here, the inner circumferential side of the light guide 112 is the central side of the arc. In addition, the outer circumferential side is a side opposite to the inner circumferential side in the radial direction of the arc.

For the reflective sheet 116, processing for adjusting the light output efficiency of the source light output from the light guide 112 is performed. As a processing technique, for example, any one of various techniques such as a silk printing method in which reflective dots are printed, a molding method in which concavity and convexity are attached by a stamper or through injection, and a groove processing method may be employed.

The irradiation direction setting section 113 that includes the prism sheet 114 and the louver film 115 is arranged in an arc shape along the outer circumferential side of the light guide 112 and receives source light emitted to the outer circumferential side (outer circumferential surface) of the light guide 112.

The prism sheet 114 sets the direction of the source light, which is emitted at a low viewing angle from the outer circumferential side of the light guide 112, such that the peak of the light output characteristic is in the direction of the normal line of the arc shape of the prism. sheet 114 by erecting it to the normal line (the radial direction) side. In addition, the louver film 115 shields (cuts off) light (low viewing-angle light) traveling in a direction other than the direction of the normal line of the arc shape of the louver film 115.

By configuring the irradiation unit 110 as described above, the first light source section 111a emits source light onto a light incidence surface located on one end side of the light guide 112, and whereby irradiation light LT1 of which the irradiation direction is set to a direction from the inner circumferential side of the light guide 112 having a curved shape (arc shape) toward the outer circumferential side thereof is emitted. In addition, the second light source section 111b emits source light onto a light incidence surface located on the other end side of the light guide 112, and whereby irradiation light LT2 of which the irradiation direction is set to a direction from the inner circumferential side of the light guide 112 having the curved shape (arc shape) toward the outer circumferential side thereof is emitted.

In other words, the direction of the source light emitted from the outer circumferential side of the light guide 112 is set (regulated) to the irradiation direction along the normal line of the light guide 112. Accordingly, the irradiation light LT1 and LT2 are emitted in a radial pattern in the direction from the inner circumferential side of the light guide 112 toward the outer circumferential side thereof.

Thus, the irradiation light LT1 is emitted in a radial pattern so as to form (set) a first irradiation light intensity distribution LID1 in the first detection area 30a and the second detection area 30b. On the other hand, the second irradiation light LT2 is emitted in a radial pattern so as to form a second irradiation light intensity distribution LID2, which is different in intensity distribution from the first irradiation light intensity LID1, in the first detection area 30a and the second detection area 30b.

As above, according to the irradiation unit 110 of this embodiment, the first light source section 111a is disposed at one end of the light guide 112, and the second light source section 111b is disposed at the other end thereof, and the first light source section 111a and the second light source section 111b are alternately turned on, whereby two irradiation light intensity distributions LID1 and LID2 can be formed. More specifically, the irradiation light intensity distribution LID1 in which the intensity increases toward the one end side of the light guide 112, and the irradiation light intensity distribution LID2 in which the intensity increases toward the other end of the light guide 112 can be alternately formed.

By forming the irradiation light intensity distributions LID1 and LID2 and receiving reflection light LR, which is reflected from the target object 10, according to the irradiation light LT having the irradiation light intensity distributions LID1 and LID2, the influence of disturbance light such as ambient light can be suppressed to be a minimal, and whereby the target object 10 can be detected with high accuracy. In other words, an infrared component included in the disturbance light can be offset, and accordingly, negative influence of the infrared component on the target object 10 can be suppressed to be a minimal. The offsetting of the infrared component included in the disturbance light will be described later in detail.

Next, the calculation of the Z position information that is performed by the calculation unit 130 and a technique for switching between the command process and the hovering process that is performed by the processing device 200 will be described with reference to FIG. 6.

In the use form of the optical detection device 100, it is assumed that a target object 10 such as a finger or a pen approaches the planar area 20, and then, a drawing operation is started in a case where a text or the like is to be drawn in the planar area 20. More specifically, when a user starts a drawing operation, as shown in FIG. 6, it is assumed that the target object 10 (a user's finger in the example shown in FIG. 6) is moved in the order of states A1, A2, and A3.

Figure 6:
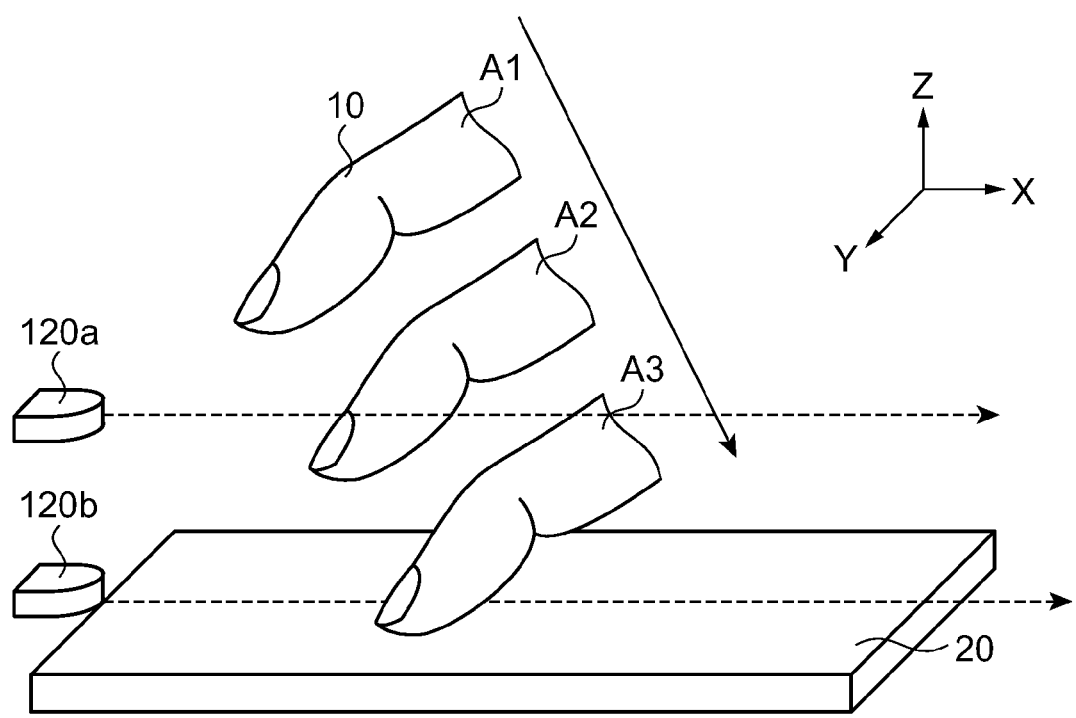
FIG. 6 is a diagram illustrating a movement of a target object at the time of switching between a command process and a hovering process.

In addition, in an application (for example, a file manager or the like) in which an icon displayed on a screen is selected and executed, it is assumed that the target object 10 is moved in the order of the states A1, A2, and A3 shown in FIG. 6 and an icon is selected and executed.

Here, the state A1 is a state in which light is not received by the first light receiving unit 120*a* and the second light receiving unit 120*b*. The state A2 is a state in which light is not received by the second light receiving unit 120*b*, but light is received only by the first light receiving unit 120*a*. The state A3 is a state in which light is received by both the first light receiving unit 120*a* and the second light receiving unit 120*b*.

The calculation unit 130 calculates the current state of the target object 10 out of the states A1 to A3 based on the results of light reception in the first light receiving unit 120*a* and the second light receiving unit 120*b*. Then, the processing device 200 changes the process in accordance with the states A1 to A3. More specifically, in the state A1, any target object 10 is not detected by the optical detection device 100, and accordingly, any process is not performed. In the state A2, it is determined the current state is in the middle of a determination operation, and accordingly, a hovering process is performed. In the state A3, it is determined that a determination operation is performed, and accordingly, a command process is performed.

In addition, in a case where light is not received by the first light receiving unit 120*a*, but light is received only by the second light receiving unit 120*b*, although such a case is difficult to suppose based on the configuration of the device, the target object 10 is located at a position close to the planar area 20. Accordingly, the current state is regarded as the state A3, and a command process is performed. However, this embodiment is not limited thereto. Accordingly, it is possible to switch between the command process and the hovering process in an appropriate and natural manner.

Here, the command process includes at least one of a command determining process and a command executing process. Performing a process corresponding to the content of a command corresponds to executing the command after the determination of the command. In this embodiment, even in a case where a command is determined only, and the execution of the command is performed after a time interval, the command process is supposed to have been performed. However, this embodiment is not limited thereto. Thus, the execution of a command may be regarded as the command process.

Accordingly, in the optical detection device 100 according to this embodiment, the switching between the command process (a determination function) and a hovering process (a floating function) can be performed by using the Z position information of the target object 10. Therefore, the drawing process or the process for selecting and executing an icon, or the like as described above can be smoothly performed, whereby an interface that is easy for a user can be realized.

Figure 7A:
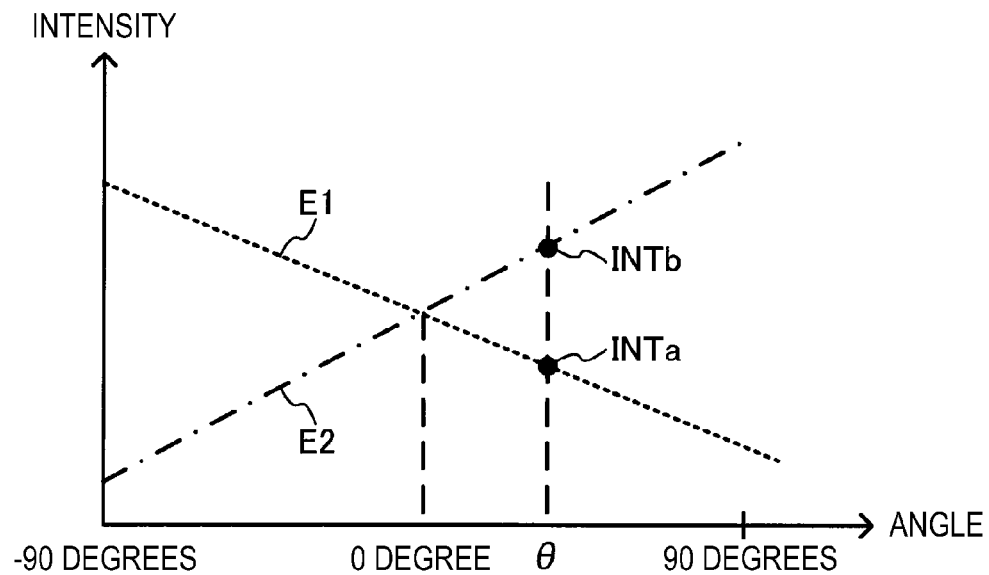
FIGS. 7A and 7B are diagrams illustrating a technique for detecting coordinate information.
Figure 7B:
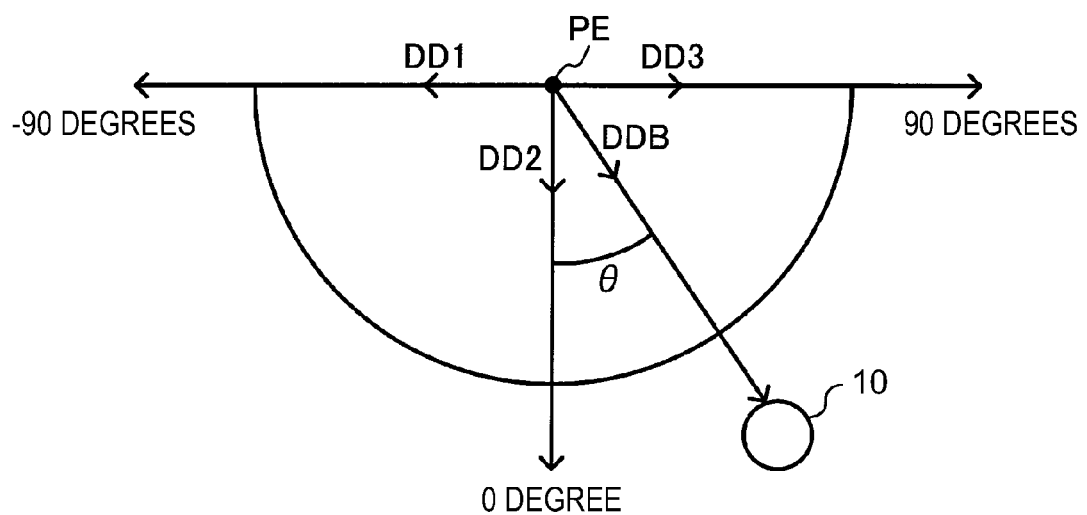

FIGS. 7A and 7B are diagrams illustrating a technique for calculating coordinate information that is performed by the optical detection device 100 according to this embodiment.

A graph E1 shown in FIG. 7A is a graph that represents the relationship between an angle of the irradiation direction of the irradiation light LT1 and the intensity of the irradiation light LT1 at the angle in the irradiation light intensity distribution LID1 shown in FIG. 5. In the graph E1 shown in FIG. 7A, the intensity is the highest in a case where the irradiation direction is a direction DD1 shown in FIG. 7B (a direction toward the left side). On the other hand, in a case where the irradiation direction is a direction DD3 (a direction toward the right side), the intensity is the lowest, and, in a case where the irradiation direction is a direction DD2, the intensity is therebetween. More specifically, for a change in the angle from the direction DD1 to the direction DD3, the intensity of the irradiation light monotonously decreases and, for example, linearly changes. In addition, in FIG. 7B, the central position of the arc shape of the light guide 112 is the arrangement position PE of the irradiation unit 110.

A graph E2 shown in FIG. 7A is a graph that represents the relationship between an angle of the irradiation direction of the irradiation light LT2 and the intensity of the irradiation light LT2 at the angle in the irradiation light intensity distribution LID2 shown in FIG. 5. In the graph E2 shown in FIG. 7A, the intensity is the highest in a case where the irradiation direction is a direction DD3 shown in FIG. 7B. On the other hand, in a case where the irradiation direction is a direction DD1, the intensity is the lowest, and, in a case where the irradiation direction is a direction DD2, the intensity is therebetween. More specifically, for a change in the angle from the direction DD3 to the direction DD1, the intensity of the irradiation light monotonously decreases and, for example, linearly changes. In addition, in FIG. 7A, although the angle of the irradiation direction and the intensity have the linear relationship, this embodiment is not limited thereto. Thus, for example, the relationship may be relationship of a hyperbolic curve or the like.

In addition, as shown in FIG. 7B, it is assumed that a target object 10 is present in the direction DDB at the angle $\theta$. In a case where the irradiation light intensity distribution LID1 is formed by allowing the first light source section 111*a* to emit light (in the case of the graph E1), as shown in FIG. 7A, the intensity at the position of the target object 10 that is present in the direction DDB (angle $\theta$) is an intensity INTa. On the other hand, in a case where the irradiation light intensity distribution LID2 is formed by allowing the second light source section 111*b* to emit light (in the case of the graph E2), the intensity at the position of a target object 10 that is present in the direction DDB is an intensity INTb.

Figure 8A:
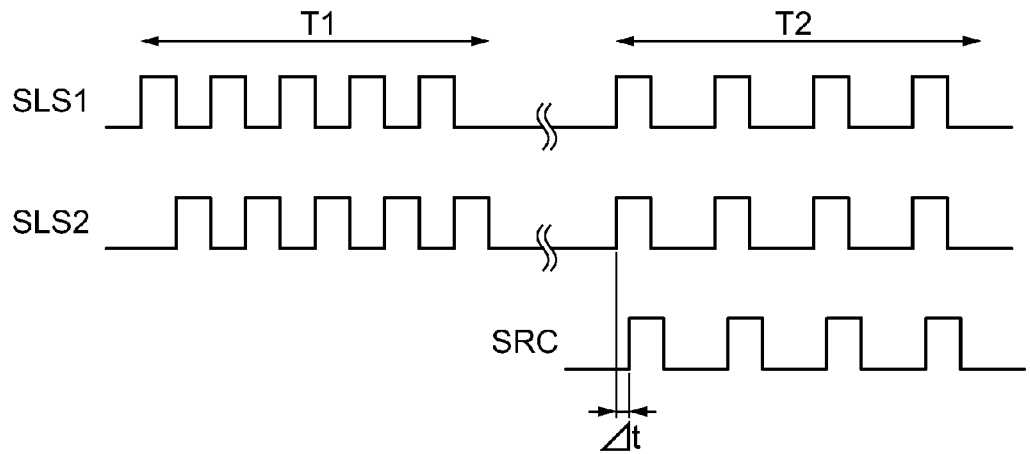
FIGS. 8A and 8B are examples of the signal waveform of a light emission control signal.
Figure 8B:
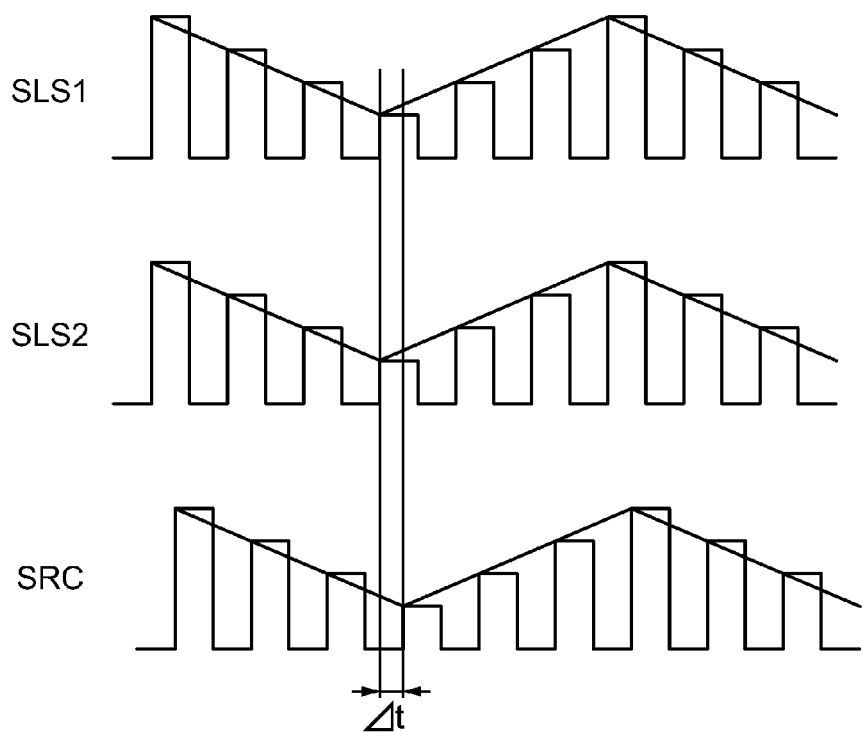
Figure 9:
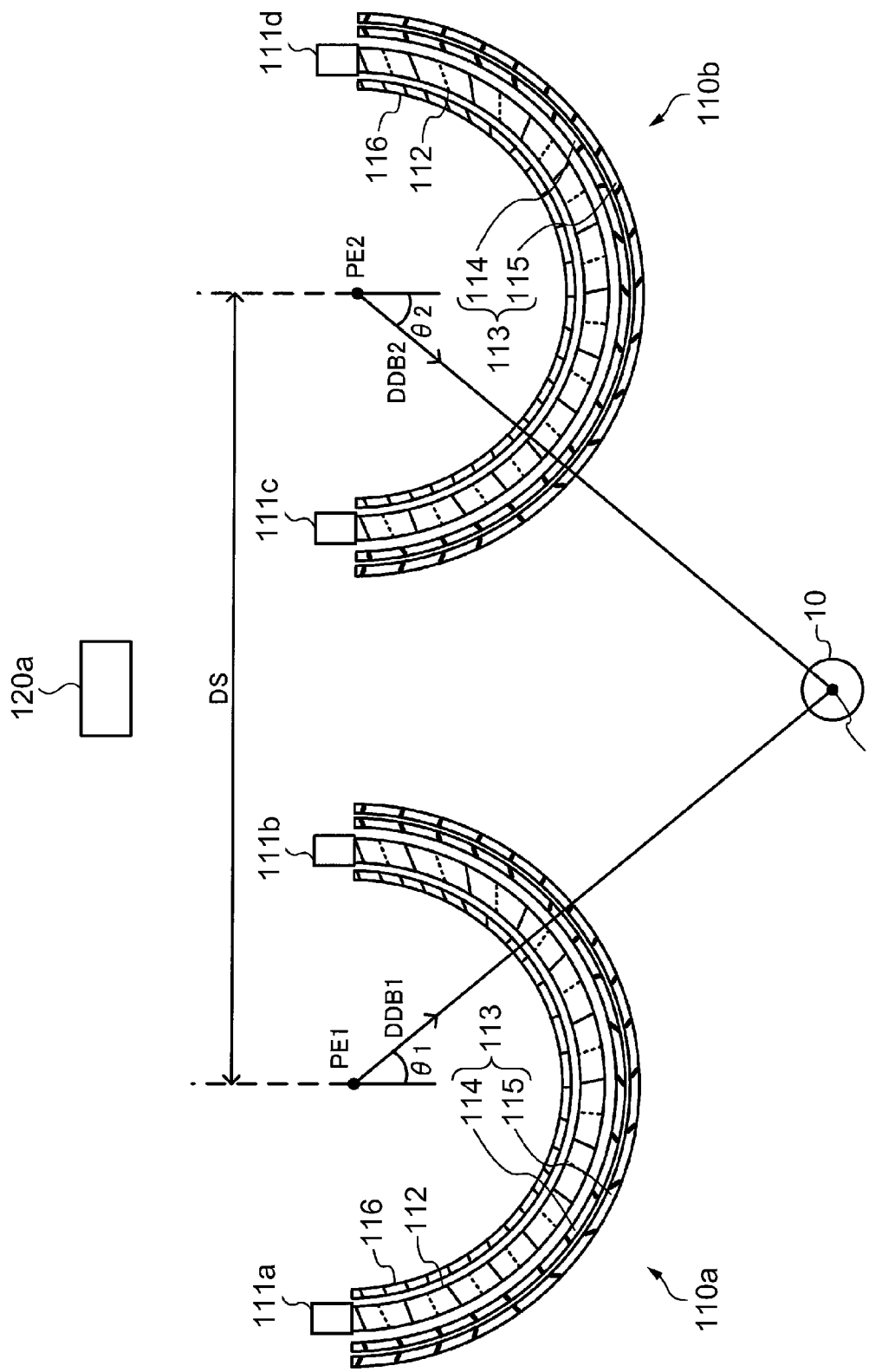
FIG. 9 is another configuration example of the irradiation unit.

Accordingly, by acquiring the relationship between the intensities INTa and INTb, the direction DDB (angle $\theta$) in which a target object 10 is positioned can be specified. For example, in a case where a distance of the target object 10 from the arrangement position PE of the irradiation unit 110 is acquired by using techniques, which are shown in FIG. 8A and 8B, to be described later, the position of the target object 10 can be specified based on the acquired distance and the direction DDB. Alternatively, as shown in FIG. 9 to be described later, in a case where two irradiation units 110*a* and 110*b* are arranged as the irradiation unit 110, and directions DDB1 ($\theta$1) and DDB2 ($\theta$2) of the target object 10 with respect to the first irradiation unit 110*a* and the second irradiation unit 110*b* are acquired, the position of the target object 10 can be specified based on the directions DDB1 and DDB2 and a distance DS between the first irradiation unit 110*a* and the second irradiation unit 110*b*.

When the direction in which the target object 10 is positioned is to be specified, a transformation function and a transformation table for acquiring the direction DDB in which a target object 10 is positioned based on the intensities INTa and INTb are used.

The transformation function is a function that has input variables of the intensities INTa and INTb and outputs a direction DDB. As shown in FIG. 7A, in a case where the intensity of the irradiation light linearly changes in accordance with a change in the angle of the irradiation direction, the transformation function is represented as a linear function.

The transformation table is a table in which predetermined intensities INTa and INTb are associated with a predetermined direction DDB. The transformation table is effective in a case where it is difficult to represent the relationship between the intensities INTa and INTb and the direction DDB as a function. The transformation function and the transformation table are acquired in advance based on the configuration and the characteristics of the optical detection device 100.

When the relationship between the intensities INTa and INTb is acquired, in this embodiment, the light receiving unit 120 receives reflection light LR1 (first reflection light) of the target object 10 when the irradiation light intensity distribution LID1 is formed. In a case where the detected amount of the received light of the reflection light LR1 at this time is denoted by Ga, Ga corresponds to the intensity INTa. In addition, the light receiving unit 120 receives reflection light LR2 (second reflection light) of the target object 10 when the irradiation light intensity distribution LID2 is formed. In a case where the detected amount of the received light of the reflection light LR2 at this time is denoted by Gb, Gb corresponds to the intensity INTb. Accordingly, by acquiring the relationship between the detected amounts Ga and Gb of received light is acquired, the relationship between the intensities INTa and INTb is acquired, whereby the direction DDB in which the target object 10 is positioned can be acquired.

For example, a control amount (for example, a current amount), a transformation coefficient, and the amount of discharged light of the first light source section 111a are denoted by Ia, k, and Ea. In addition, a control amount (for example, a current amount), a transformation coefficient, and the amount of discharged light of the second light source section 111b are denoted by Ib, k, and Eb. Then, the following Equations (1) and (2) are satisfied.

$$Ea = k \cdot Ia \quad (1)$$

$$Eb = k \cdot Ib \quad (2)$$

In addition, an attenuation coefficient of the source light (first source light) emitted from the first light source section 111a is denoted by fa, and the detected amount of received light of the reflection light LR1 corresponding to the source light is denoted by Ga. Furthermore, an attenuation coefficient of the source light (second source light) emitted from the second light source section 111b is denoted by fb, and the detected amount of received light of the reflection light LR2 corresponding to the source light is denoted by Gb. Then, the following Equations (3) and (4) are satisfied.

$$Ga = fa \cdot Ea = fa \cdot k \cdot Ia \quad (3)$$

$$Gb = fb \cdot Eb = fb \cdot k \cdot Ib \quad (4)$$

Accordingly, the ratio between the detected amounts Ga and Gb of received light can be represented in the following Equation (5).

$$Ga/Gb = (fa/fb) \cdot (Ia/Ib) \quad (5)$$

Here, Ga/Gb can be specified based on the result of light reception in the light receiving unit 120, and Ia/Ib can be specified based on the control amount of the calculation unit 130. The relationships between the intensities INTa and INTb shown in FIG. 7A and the attenuation coefficients fa and fb are unique. For example, in a case where the attenuation coefficients fa and fb are small values so as to allow the attenuation amounts to be large, the intensities INTa and INTb are represented to be small. On the other hand, in a case where the attenuation coefficients fa and fb are large values so as to allow the attenuation amounts to be small, the intensities INTa and INTb are represented to be large. Accordingly, by acquiring the ratio fa/fb between the attenuation ratios by using the Equation (5), the direction, the position, and the like of the target object 10 can be acquired.

More specifically, the control amount Ia of one side is fixed to Im, and the control amount Ib of the other side is controlled such that the ratio Ga/Gb of the detected amounts of received light becomes one. For example, the first light source section 111a and the second light source section 111b are controlled to be alternately turned on in opposite phases, the waveform of the detected amount of received light is analyzed, and the control amount Ib of the other side is controlled such that the detected waveform is not observed (Ga/Gb=1). Then, the ratio fa/fb between the attenuation coefficients is acquired based on the control amount Ib=Im·(fa/fb) of the other side, whereby the direction, the position, and the like of the target object 10 are acquired.

In addition, as in the following Equations (6) and (7), the control amounts may be controlled such that Ga/Gb=1, and a sum of the control amounts Ia and Ib is constant.

$$Ga/Gb = 1 \quad (6)$$

$$Im = Ia + Ib \quad (7)$$

By substituting Equations (6) and (7) represented above for Equation (5), the following Equation (8) is acquired.

$$\begin{aligned} Ga/Gb &= 1 \\ &= (fa/fb) \cdot (Ia/Ib) \\ &= (fa/fb) \cdot \{(Im - Ib)/Ib\} \end{aligned} \quad (8)$$

In addition, Ib can be represented as in the following Equation (9) based on Equation (8) represented above.

$$Ib = \{fa/(fa+fb)\} \cdot Im \quad (9)$$

Here, by setting $\alpha = fa/(fa+fb)$, the Equation (9) is represented as in the following Equation (10), and the ratio fa/fb between the attenuation coefficients can be represented in the following Equation (11) by using $\alpha$.

$$Ib = \alpha \cdot Im \quad (10)$$

$$fa/fb = \alpha/(1-\alpha) \quad (11)$$

Accordingly, by controlling the control amounts such that Ga/Gb=1, and the sum of the control amounts Ia and Ib is a constant value Im, $\alpha$ can be acquired by using Equation (10) represented above based on the control amounts Ib and Im at that time. Then, by substituting $\alpha$ for Equation (11) represented above, the ratio fa/fb between the attenuation coefficients can be acquired. Accordingly, the direction, the position, and the like of the target object 10 can be acquired. By controlling the control amounts such that Ga/Gb=1, and the sum of Ia and Ib is constant, the influence of disturbance light and the like can be offset, whereby the detection accuracy can be improved.

Next, an example of the technique for detecting the coordinate information of a target object 10 using the optical detection device 100 according to this embodiment will be described. FIG. 8A is an example of a signal waveform for light emission control of the first light source section 111a and the second light source section 111b. A signal SLS1 is a light emission control signal of the first light source section 111a, and a signal SLS2 is a light emission control signal of the second light source section 111b, and the signals SLS1 and SLS2 are signals in opposite phases. In addition, a signal SRC is a light reception signal.

For example, the first light source section 111a is turned on (emits light) in a case where the signal SLS1 is in the H level, and is turned off in a case where the signal SLS1 is in the L level. In addition, the second light source section 111b is turned on (emits light) in a case where the signal SLS2 is in the H level, and is turned off in a case where the signal SLS2 is in the L level. Accordingly, during a first period T1 shown in FIG. 8A, the first light source section 111a and the second light source section 111b are alternately turned on. In other words, during a period in which the first light source section 111a is turned on, the second light source section 111b is turned off. Accordingly, the irradiation light intensity distribution LID1 as shown in FIG. 5 is formed. On the other hand, during a period in which the second light source section 111b is turned on, the first light source section 111a is turned off. Accordingly, the irradiation light intensity distribution LID2 as shown in FIG. 5 is formed.

As above, the calculation unit 130, during the first period T1, performs a control operation of alternately allowing the first light source section 111a and the second light source section 111b to emit light (to be turned on). Then, in the first period T1, the direction, in which the target object 10 is positioned, viewed from the optical detection device 100 (the irradiation unit 110) is detected. More specifically, for example, as Equations (6) and (7) represented above, the light emission control operation is performed during the first period T1 such that Ga/Gb=1 and the sum of the control amounts Ia and Ib is constant. Then, as shown in FIG. 7B, the direction DDB in which the target object 10 is positioned is acquired. For example, the ratio fa/fb between the attenuation coefficients is acquired by using Equations (10) and (11) represented above, and the direction DDB in which the target object 10 is positioned is acquired by using the techniques described with reference to FIGS. 7A and 7B.

Then, during a second period T2 following the first period T1, a distance from the irradiation unit 110 to the target object 10 (a distance in the direction DDB) is detected based on the result of light reception in the light receiving unit 120. Then, the position of the target object 10 is detected based on the detected distance and the direction DDB of the target object 10. In other words, In FIG. 8B, by acquiring the distance from the arrangement position PE of the irradiation unit 110 to the target object 10 and the direction DDB in which the target object 10 is positioned, the X and Y coordinate position of the target object 10 can be specified.

More specifically, in FIG. 8A, a time Δt until the light reception signal SRC becomes active (timing when the reflection light LR is received) from light emission timing of the first light source section 111a and the second light source section 111b according to the light emission control signals SLS1 and SLS2 is detected. In other words, time Δt until light emitted from the first light source section 111a and the second light source section 111b is reflected by the target object 10 and is received by the light receiving unit 120 is detected. Since the speed of light is known, by detecting the time Δt, a distance up to the target object 10 can be detected. In other words, a deviation width (time) of the arrival time of light is measured, and the distance is acquired based on the speed of light. As above, by acquiring the distance based on a time deviation between the turning-on timing of the light source and the light receiving timing, the position of the target object 10 can be specified based on the acquired distance together with the result of the angle.

Since the speed of light is quite high, there is a problem in that it is difficult to detect the time Δt by acquiring a simple difference based on only electric signals. In order to solve such a problem, as shown in FIG. 8B, it is preferable that the light emission control signal is modulated. Here, FIG. 8B is an example of a schematic signal waveform in which the intensity (the amount of current) of light is schematically represented by the amplitudes of the control signals SLS1 and SLS2.

More specifically, in FIG. 8B, the distance is detected, for example, by using a known continuous wave modulation TOF (Time Of Flight) method. In the continuous wave modulation TOF method, continuous light of which the intensity is modulated by using a continuous wave having a predetermined period is used. By emitting the light of which the intensity is modulated and receiving the reflection light thereof a plurality of times at a time interval that is shorter than the modulation period, the waveform of the reflection light is modulated, and the distance is detected by acquiring a phase difference between the irradiation light and the reflection light. In addition, the intensity of the light corresponding to only one of the control signals SLS1 and SLS2 shown in FIG. 8B may be modulated. Furthermore, the waveform may not be a waveform modulated by a clock waveform but may be a waveform modulated by a chopping wave or a sinusoidal wave as shown in FIG. 8B. In addition, the distance may be detected by using a pulse-modulation TOF method in which a pulse light is used as the continuously modulated light. The technique used for detecting the distance is disclosed in detail, for example, in JP-A-2009-8537 and the like.

Modified Examples

FIG. 9 shows a modified example of the irradiation unit 110 according to this embodiment. In FIG. 9, as the irradiation unit 110, a first irradiation unit 110a and a second irradiation unit 110b are disposed. The first irradiation unit 110a and the second irradiation unit 110b are arranged so as to be separated from each other by a predetermined distance DS in a direction extending along the X-Y plane. For example, the irradiation units 110a and 110b are separated from each other by the distance DS along the X direction shown in FIG. 1.

The first irradiation unit 110a emits first irradiation light of which the intensity differs in accordance with the irradiation direction in a radial pattern. The second irradiation unit 110b emits second irradiation light of which the intensity changes in accordance with the irradiation direction in a radial pattern. The light receiving unit 120a (120b) receives first reflection light that is acquired by allowing the first irradiation light emitted from the first irradiation unit 110a to be reflected by the target object 10 and second reflection light that is acquired by allowing the second irradiation light emitted from the second irradiation unit 110b to be reflected by the target object 10.

The calculation unit 130 detects the direction of the target object 10 with respect to the first irradiation unit 110a as a first direction DDB1 (angle θ1) based on the result of reception of the first reflection light. In addition, the calculation unit 130 calculates the direction of the target object 10 with respect to the second irradiation unit 110b as a second direction DDB2 (angle θ2) based on the result of reception of the second reflection light. Then, the position of the target object 10 is acquired based on the first direction DDB1 (θ1), the second direction DDB2 (θ2), and the distance DS between the first irradiation unit 110a and the second irradiation unit 110b. According to the modified example shown in FIG. 9, similarly to FIGS. 8A and 8B, the position of the target object 10 can be detected even in a case where the distance between the irradiation unit 110 (optical detection device 100) and the target object 10 is not acquired.

Figure 10:
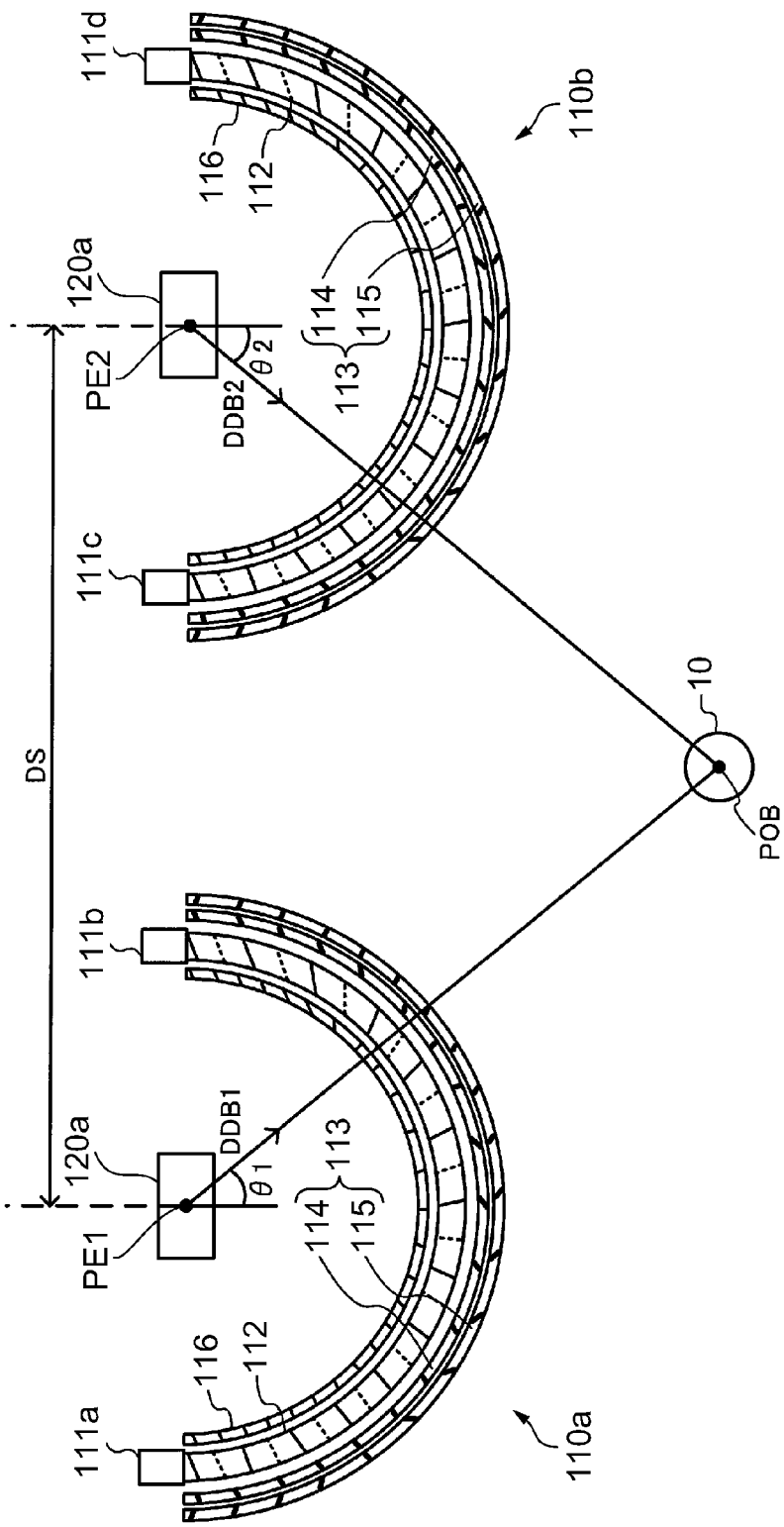
FIG. 10 is yet another configuration example of the irradiation unit.

The arrangement position of the light receiving unit 120a (120b) is not limited to the configuration shown in FIG. 9. For example, as shown in FIG. 10, a configuration may be employed in which the light receiving unit 120a (120b) is disposed at each one of the arrangement positions PE1 and PE2 of the first irradiation unit 110a and the second irradiation unit 110b.

Accordingly, even in a case where the target object 10 is an object such as a retroreflective member for which the incidence angle and the reflection angle are the same, the position of the target object 10 can be detected with high accuracy.

CONFIGURATION EXAMPLE OF ELECTRONIC APPARATUS

Figure 11:
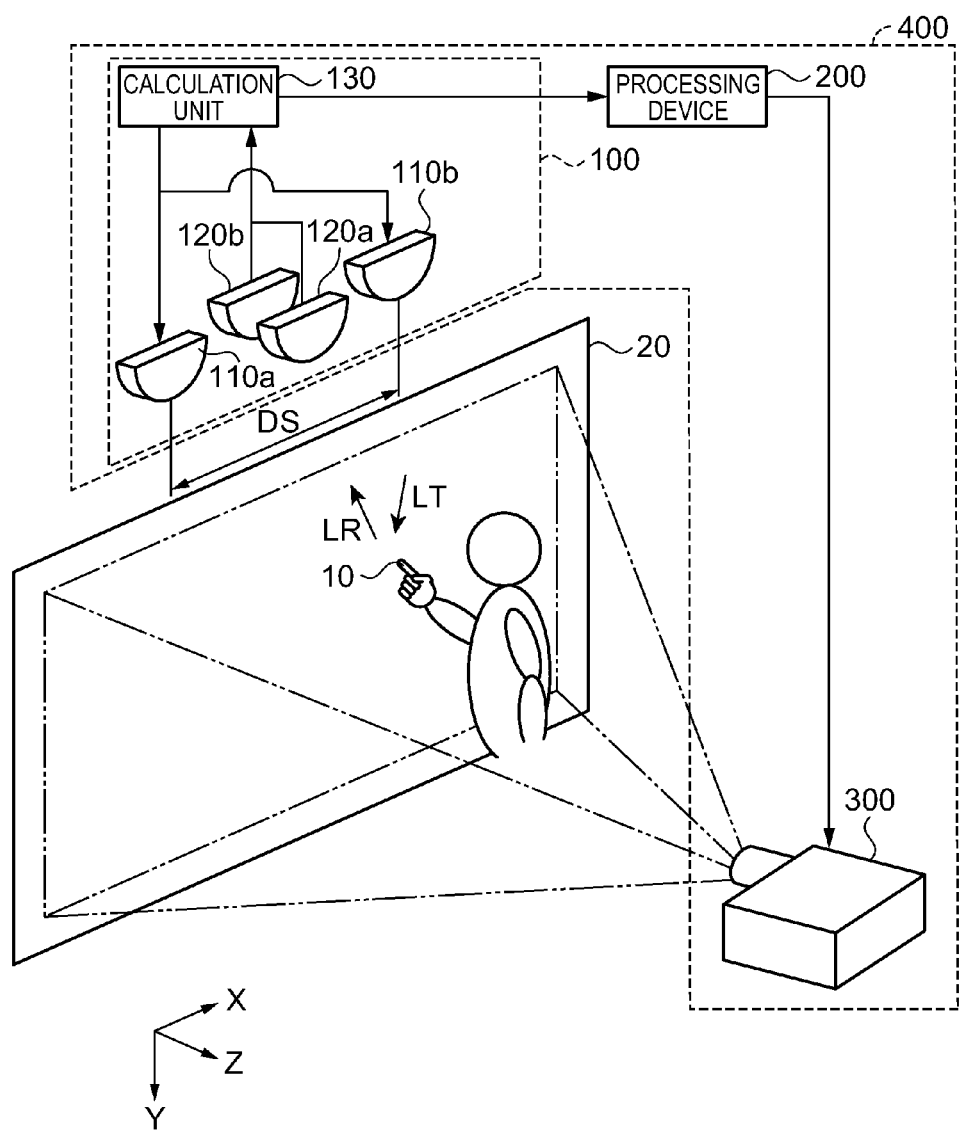
FIG. 11 is a configuration example of an electronic apparatus including the optical detection device.

FIG. 11 shows a basic configuration example of an electronic apparatus 400 (display apparatus) using the optical detection device 100 according to this embodiment. FIG. 11 is an example in a case where the optical detection device 100 according to this embodiment is applied to a projection-type display device (projector) called a liquid crystal projector or a digital micromirror device.

The electronic apparatus 400 according to this embodiment includes an optical detection device 100, a processing device 200, and an image projecting device 300 (image generating device). The image projecting device 300 projects image display light from a projection lens disposed on the front side of a casing toward a display surface of a display unit that is a planar area 20 in an enlarged scale. More specifically, the image projecting device 300 generates display light of an image and outputs the display light toward the display surface through the projection lens. Accordingly, the image is displayed on the display surface.

In the configuration example shown in FIG. 11, as the irradiation unit, a first irradiation unit 110a and a second irradiation unit 110b are arranged. The first irradiation unit 110a and the second irradiation unit 110b are separated from each other by a predetermined distance DS in a direction extending along the display surface. More specifically, the irradiation units 110a and 110b are separated from each other by the distance DS along the X direction. As described above, the first irradiation unit 110a emits first irradiation light LT of which the intensity differs in accordance with the irradiation direction in a radial pattern along the display surface, and the second irradiation unit 110b emits second irradiation light LT of which the intensity differs in accordance with the irradiation direction in a radial pattern along the display surface.

The first light receiving unit 120a and the second light receiving unit 120b receive reflection light LR acquired by allowing the irradiation light LT to be reflected by a target object 10 such as a user's finger or a touch pen. As shown in FIG. 4, the first detection area 30a and the second detection area 30b are set on the front side (the Z direction side) of the display surface (the planar area 20) along the display surface.

In addition, the first light receiving unit 120a and the second light receiving unit 120b are located between the first irradiation unit 110a and the second irradiation unit 110b in the X direction and, in the configuration example shown in FIG. 11, are located at the center thereof. In addition, in the Z direction (a direction intersecting the display surface), the second light receiving unit 120b is located on one side that is the planar area 20 side of the first irradiation unit 110a and the second irradiation unit 110b, and the first light receiving unit 120a is located on the other side. In other words, in the Z direction, the first irradiation unit 110a and the second irradiation unit 110b are located between the first light receiving unit 120a and the second light receiving unit 120b.

In addition, it is preferable that the first light receiving unit 120a and the second light receiving unit 120b are arranged so as to have plane symmetry with respect to a plane that passes through the first irradiation unit 110a and the second irradiation unit 110b and extending along the display surface. By arranging as such, the positional relationship of the first light receiving unit 120a with respect to the target object 10, the first irradiation unit 110a, and the second irradiation unit 110b and the positional relationship of the second light receiving unit 120b with respect to the target object 10, the first irradiation unit 110a, and the second irradiation unit 110b can be matched. Accordingly, a change in the light reception intensity of the first light receiving unit 120a and a change in the light reception intensity of the second light receiving unit 120b when the direction in which the target object 10 is located changes are substantially the same. Accordingly, in the light reception intensity-to-direction transformation at the time of calculating the X and Y coordinates, the first light receiving unit 120a and the second light receiving unit 120b can use the same transformation function and the same transformation table. Accordingly, a plurality of the transformation function or a plurality of the transformation table are not used, whereby calculation resources such as a memory and a CPU can be efficiently used.

The calculation unit 130 is electrically connected to the first light receiving unit 120a and the second light receiving unit 120b and calculates the positional information of a target object 10 based on the results of light reception of the first light receiving unit 120a and the second light receiving unit 120b. In addition, the calculation unit 130 is electrically connected to the first irradiation unit 110a and the second irradiation unit 110b and can control the amounts of light emission of the first irradiation unit 110a and the second irradiation unit 110b.

The processing device 200 is electrically connected to the calculation unit 130 and the image projecting device 300 can perform a drawing process or a cursor moving process based on the positional information of a target object 10. In addition, in an application (for example, a file manager or the like) in which an icon projected onto a display surface is selected and executed, an icon intended by a user can be appropriately selected and executed. Furthermore, the processing device 200 may perform at least one command process out of a drawing command determining process and a drawing command executing process as the command process by using the X coordinate information and the Y coordinate information of the target object 10.

Accordingly, as described above, a drawing process of a character or a graphic can be performed. More specifically, for example, the process may be considered to be performed in an apparatus such as an electronic blackboard.

In addition, the display device according to this embodiment is not limited to the projection-type display device shown in FIG. 11 and can be applied to various display devices that are mounted in various electronic apparatuses. As electronic apparatuses to which the optical detection device 100 according to this embodiment can be applied, there are a personal computer, a car navigation device, a ticket-vending machine, a mobile information terminal, a banking terminal, or the like. The electronic apparatus, for example, may include a display unit (display device) that displays an image, an input unit that is used for inputting information, a processing unit that performs various processes based on the input information, and the like.

Optical Detection Method

Figure 12:
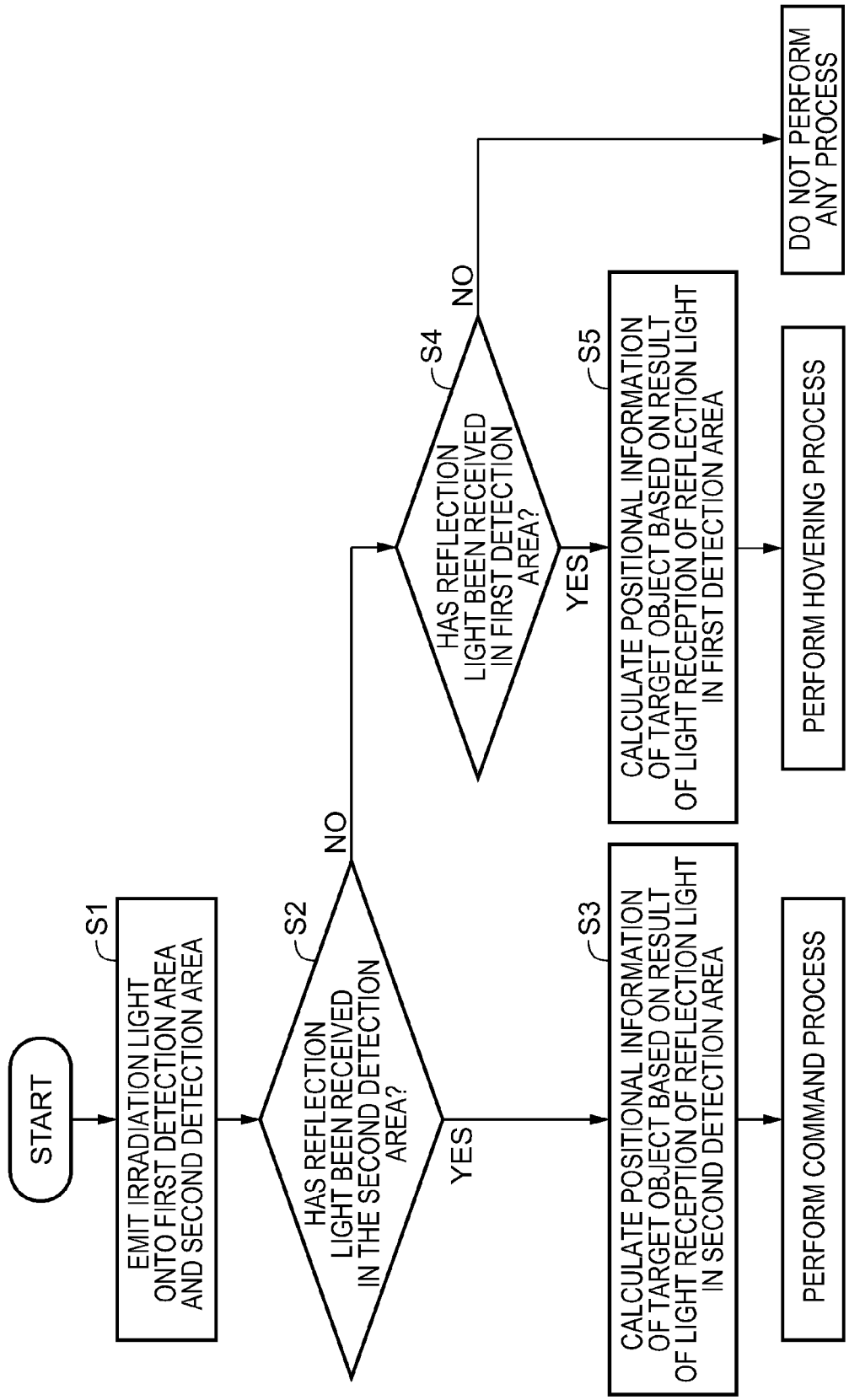
FIG. 12 is an example of a flowchart illustrating an optical detection method.

FIG. 12 is an example of a flowchart illustrating an optical detection method relating to the optical detection device 100 according to this embodiment. First, irradiation light LT is emitted onto the first detection area 30a and the second detection area 30b formed along the planar area (display surface) 20 by using the first irradiation unit 110a and the second irradiation unit 110b (Step S1).

Then, in a case where the first light receiving unit 120a receives the reflection light LR (Step S2: Yes), the positional information of the target object 10 is calculated based on the reflection light LR acquired by allowing the irradiation light LT to be reflected by the target object 10 in the first detection area 30a (Step S3). Then, the command process is performed based on the positional information.

In a case where the reflection light LR is not received by the first light receiving unit 120a (Step S2: No), and the reflection light LR is received by the second light receiving unit 120b (Step S4: Yes), the positional information of the target object 10 is calculated based on the reflection light LR acquired by allowing the irradiation light LT to be reflected by the target object 10 in the second detection area 30b (Step S5). Then, the hovering process is performed based on the positional information.

In a case where the reflection light LR is not received by the first light receiving unit 120a (Step S2: No), and the reflection light LR is not received by the second light receiving unit 120b (Step S4: No), any process is not performed.

By performing such an operation, it is possible to switch between the command process (determination function) and the hovering process (floating function) by using the Z position information of the target object 10. Accordingly, it is possible to smoothly perform the drawing process, the icon selecting and executing process, and the like as described above, and whereby an interface that can be easily used by a user can be realized.

Although the embodiment has been described in detail as above, it is apparent to those skilled in the art that various changes can be made therein within the scope not substantially departing from new matters and advantages of the invention. Accordingly, such modified examples belong to the scope of the invention. For example, in the description presented above or in the drawings, in a case where a term that has a broader meaning than or the same meaning as those of other terms used together is used at least once, in any place in the description or the drawings, the other terms may be substituted by the above-described term. In addition, the configurations and the operations of the optical detection device, the display device, and the electronic apparatus are not limited to those described in the embodiment, and various changes can be made therein.

The entire disclosure of Japanese Patent Application No. 2010-248172, filed Nov. 5, 2010 is expressly incorporated by reference herein.

What is claimed is:

1. An optical detection device comprising:
an irradiation unit that emits irradiation light;
first and second light receiving units that receive reflection light of the irradiation light reflected by a target object; and
a calculation unit that calculates positional information of the target object based on a light reception result of at least one of the first and second light receiving units,
wherein the first and second light receiving units receive the reflection light that is incident in a direction along a planar area,
wherein a distance between the second light receiving unit and the planar area is shorter than a distance between the first light receiving unit and the planar area,
wherein the irradiation unit includes a first light source section that forms a first irradiation light intensity distribution in a light intensity distribution forming area and a second light source section that forms a second irradiation light intensity distribution, of which an intensity distribution is different from that of the first irradiation light intensity distribution, in the light intensity distribution forming area, and
wherein the first irradiation light intensity distribution is an intensity distribution in which an intensity of the irradiation light decreases from one end side of the light intensity distribution forming area toward the other end side, and the second irradiation light intensity distribution is an intensity distribution in which an intensity of the irradiation light decreases from the other side of the light intensity distribution forming area toward the one end side.

2. The optical detection device according to claim 1, wherein the irradiation unit is arranged between the first light receiving unit and the second light receiving unit in an intersection direction intersecting the planar area.

3. The optical detection device according to claim 1, wherein the first and second light receiving units respectively include a light receiving device that receives the reflection light and an incidence light regulating unit that regulates an incidence direction of the reflection light in which the reflection light is incident to the light receiving device.

4. The optical detection device according to claim 1,
wherein the irradiation unit emits the irradiation light radially, of which an intensity differs in accordance with an irradiation direction in a plan view toward the planar area, and
wherein the calculation unit calculates a direction in which the target object is positioned with respect to the irradiation unit based on the light reception result of at least one of the first and second light receiving units.

5. An electronic apparatus comprising the optical detection device according to claim 1.

6. An electronic apparatus comprising the optical detection device according to claim 2.

7. An electronic apparatus comprising the optical detection device according to claim 3.

8. An electronic apparatus comprising the optical detection device according to claim 4.

9. An optical detection method for detecting positional information of a target object, the optical detection method comprising:
emitting irradiation light onto a first area that is formed along a planar area and is interposed between first and second faces facing each other;
emitting irradiation light onto a second area that is located between the first area and the planar area, is formed along the planar area, and is interposed between third and fourth faces facing each other;

receiving reflection light of the irradiation light that is reflected by the target object in at least one of the first and second areas; and calculating the positional information of the target object based on a light reception result of the reflection light;

wherein a first irradiation light intensity distribution is formed in a light intensity distribution forming area and a second irradiation light intensity distribution, of which an intensity distribution is different from that of the first irradiation light intensity distribution, in the light intensity distribution forming area, and wherein the first irradiation light intensity distribution is an intensity distribution in which an intensity of the irradiation light decreases from one end side of the light intensity distribution forming area toward the other end side, and the second irradiation light intensity distribution is an intensity distribution in which an intensity of the irradiation light decreases from the other side of the light intensity distribution forming area toward the one end side.

* * * * *